United States Patent [19]

Lukas et al.

[11] Patent Number: 5,164,947
[45] Date of Patent: Nov. 17, 1992

[54] SINGLE-FREQUENCY, FREQUENCY DOUBLED LASER

[75] Inventors: Gregory J. Lukas, Lisle; Daniel M. Ott, Glendale Heights; Douglas W. Anthon, Wheaton; Donald L. Sipes, Lisle, all of Ill.; Timothy J. Pier, Kenosha, Wis.

[73] Assignee: Amoco Corporation, Chicago, Ill.

[21] Appl. No.: 662,179

[22] Filed: Feb. 28, 1991

[51] Int. Cl.⁵ .............................................. H01S 3/10
[52] U.S. Cl. ........................................ 372/22; 372/21; 372/69; 372/70
[58] Field of Search ....................... 372/21, 22, 69-72

[56] References Cited

U.S. PATENT DOCUMENTS

| | | | |
|---|---|---|---|
| 4,127,827 | 11/1978 | Barry | 372/22 |
| 4,247,166 | 1/1981 | Yeh | 359/484 |
| 4,272,694 | 6/1981 | Jacobs | 359/328 |
| 4,331,891 | 5/1982 | Rizzo | 359/328 |
| 4,346,314 | 8/1982 | Craxton | 359/328 |
| 4,500,178 | 2/1985 | Yeh | 359/498 |
| 4,637,026 | 1/1987 | Liu | 372/22 |
| 4,809,291 | 2/1989 | Byer et al. | 372/22 |
| 4,914,664 | 4/1990 | Woodward | 372/20 |
| 5,031,182 | 7/1991 | Anthon et al. | 372/70 |

OTHER PUBLICATIONS

Heavens & Ditchiburn, "Insight into Optics" Wiley, 1991, p. 89.

Primary Examiner—Georgia Y. Epps
Attorney, Agent, or Firm—James A. Gabala; William H. Magidson; Frank J. Sroka

[57] ABSTRACT

A laser is disclosed comprising: a source of optical pumping radiation; a lasant rod; an input mirror; two quarter-wave plates; polarizing means, adjacent to a quarter-wave plate, for polarizing said lasant light radiated from said rod; second harmonic generating means for producing an output at twice the frequency at which said rod lases; and an output coupler.

32 Claims, 1 Drawing Sheet

SINGLE-FREQUENCY, FREQUENCY DOUBLED LASER

Technical Field

This invention relates to the general subject of lasers, and, in particular, to the subject of solid-state, diode-laser pumped frequency doubled lasers.

BACKGROUND OF THE INVENTION

Intracavity doubled Nd:YAG lasers were proposed as sources of green light more than 20 years ago, and many such devices have been built and analyzed in the ensuing years. Typical devices consisted of a Nd:YAG rod, a Brewster polarizer and a Type-I phase-matched crystal, such as $Ba_2NaNb_5O_{15}$ or $LiIO_3$. Several examples of this type of device are shown in the book by Koechner, *Solid State Laser Engineering*. Springer-Verlag. 2nd edition, 1988. In general, it was observed that these devices were much less stable with the non-linear crystal in the cavity than they were without it. Several tentative explanations involving mode-beating or thermal effects were suggested, but no definitive studies were carried out. It was often thought that the non-linear crystal was simply a non-linear amplifier for fluctuations already present in the undoubled laser. Stability was not the only problem with these devices; crystal damage and other materials problems tended to limit the performance of the devices.

Interest in intracavity doubled lasers was renewed in the 1980's when new non-linear materials and diode-laser pumping techniques became available. One new non-linear material was $KTiOPO_4$, potassium titanyl phosphate or KTP, a highly non-linear material which was free from many of the mechanical, thermal and optical problems which had plagued earlier materials. Phase-matching in KTP is Type-II, so the simple Brewster plate polarizers used with earlier materials were not adequate.

Using Type-II non-linear crystals, such as KTP, for intra-cavity second harmonic generation (SHG) introduces a variety of polarization related problems. Placing a birefringent crystal in an unpolarized laser cavity often produces undesirable effects because the crystal axis will define two orthogonal polarizations that will, in general, differ in both their optical path lengths and losses. The path length difference leads to two weakly coupled sets of resonant cavity frequencies which often give rise to erractic mode-hopping behavior and output noise. Furthermore, any differenes in the relative losses for each polarization tend to result in a laser output which is polarized along one axis of the crystal. Since radiation polarized along two crystal axes is required for Type-II doubling, output radiation polarized only one axis would prevent or at least degrade the efficiency of the SHG process. Retardation plates have been used to control the polarizations inside the cavity. The issue of noise was not addressed. Typical examples are found in the following U.S. Pat. Nos.: 4,413,342 to Cohen, et al.; 4,127,827 and 3,975,693 to Barry et al.; 4,617,666; 4,637,026; 4,048,515; and 4,618,957 to Liu.

Baer appears to have been the first to have built a diode-laser pumped Nd:YAG laser which was intracavity doubled with KTP. See for example, U.S. Pat. Nos.: 4,653,056; 4,656,635; 4,701,929; 4,756,003; and 4,872,177. An early cavity used by Baer consisted of an end-pumped Nd:YAG rod, a KTP crystal and a curved reflector, and had no polarization controlling elements. Baer reported the following results: (1) when the laser was operated without an intracavity etalon, it exhibited optical noise having a frequency in the range from about 10 kilohertz to multiples of 100 kilohertz; (2) when an etalon was added to reduce the number of oscillating modes to two, well-defined oscillations in optical power were observed; and (3) when the laser was forced to run in a single mode with an etalon, the output power was stable, but the laser produced very little green output. Baer interpreted his results in terms of a rate equation model which included both sum generation and cross saturation effects. Baer believed that the laser amplitude fluctuations occurred because the system has two non-linear feedback mechanisms operating on two differentt timescales. He concluded that the oscillations were a fundamental barrier to successful multimode operation of intracavity doubled lasers.

Later designs by Baer added a Brewster plate polarizer oriented at 45° from the axis of the KTP to provide equal power in the two crystal polarizations. This design suffered from the fact that, in general, a Brewster plate and a birefringent crystal cannot be combined in a low-loss optical cavity. The linear polarization passed by the Brewster plate will be transformed by the KTP into an elliptical polarization that will experience a significant loss upon passing through the Brewster plate. Only in the special case (not described or discussed by Baer) when the KTP functions as a half-integral waveplate, will the cavity losses be low. Because KTP is strongly birefringent, having temperature-dependent refractive indices, a typical few millimeter long, doubling crystal of KTP will act as a temperature-variable, multiple-order retardation plate. In general, for low-loss eigenmodes to exist in a laser cavity containing a Brewster plate and a birefringent element, the birefringent element must be a full-or half-wave plate. Thus, success in producing a low loss optical cavity at a given wavelength is critically dependent upon rigid control of the crystal length and the cavity temperature. A sensitive inter-relationship exists between crystal length, cavity temperature and polarization losses.

Others have also attempted to make a solid-state laser which uses non-linear crystal or lasant material to produce green light from infrared light using the principles of second harmonic generation. The following U.S. patents are illustrative of the many practitioners who have attempted to make a practical apparatus: U.S. Pat. Nos. 3,624,549 to Geusic et al.; 3,750,670 to Palanos et al.; 3,619,637 to Godo et al.; and 4,856,006 to Yano et al.

More recently, Anthon et al. disclosed an intracavity frequency doubled laser (U.S. Pat. Nos. 4,933,947 and assigned to AMOCO Corporation) having improved amplitude stability. This was achieved by substantially eliminating spatial hole burning in the lasant material and by maintaining the optical cavity of the laser at a temperature which results in substantially noise-free generation of optical radiation.

Despite what appears to be a fairly complete, general understanding of the theory of the frequency doubling process, a reliable, solid-state, diode-laser-pumped, frequency-doubled laser has yet to find complete acceptance in the market place. Heretofore such lasers have been plagued with a variety of problems. These problems have included: a variation in power output during start-up; output powers which vary significantly with changes in temperature and over time; non-repeatable output power with a variation in cavity temperature;

multiplide (e.g. two or three spectral modes running simultaneously; differing polarizations in the spectral modes without any consistent relationship between them; an infrared (IR) polarization which was not defined; spectral modes and output powers which change when the laser is tapped or slightly vibrated; and laser operation (i.e., output power and spectral modes) which seem to be unduly sensitive to normally occurring changes in the characteristics of the pumping diode-laser.

Clearly a reliable and dependable, single-frequency, frequency-doubled laser would be welcomed by the photonics industry. More importantly, if a solid-state, diode-laser source of infrared optical pumping radiation is used, a miniature source of visible green light can be obtained.

SUMMARY OF THE INVENTION

One object of the present invention is to provide a reliable source of essentially single-frequency, frequency-doubled laser light.

Another object of the invention is to provide a diode-laser-pumped, solid-state laser which produces a stable and reliable source of green light.

Yet another object of the invention is to provide a stable green laser which uses a laser diode, a rare earth doped crystal, and a frequency doubling material in a common cavity.

Another object of the invention is to provide a stable and reliable solid-state, diode-laser-pumped laser which uses Nd:YAG and KTP, which does not have the problems resulting from spatial hole burning, and which has a single-frequency spectral mode for an output.

Still another object of the invention is to provide a frequency-doubled laser system having a cavity which ensures doubling and avoids a polarized mode of operation wherein the oscillating modes compete.

Another object of the invention is to combine Lyot filter principles and second harmonic generating principles to produce a single-frequency, frequency-doubled laser.

In accordance with the present invention a laser is disclosed comprising a lasant material which is adapted to lase at a predetermined wavelength in response to optical pumping radiation and which has a front end and a back end; an input mirror for substantially reflecting lasant light towards said back end of said lasant material; an output coupler for substantially reflecting laser light towards said input mirror and for passing therethrough at least some laser light at a harmonic of said predetermined wavelength; means, located between said input mirror and said output coupler, for substantially eliminating spatial hole burning in said lasant material while producing laser light at said predetermined wavelength; polarizing means, located to receive said light at said predetermined wavelength from said lasant material, for polarizing said lasant light from said lasant material; and second harmonic generating means, located to receive said polarized laser light and having optical axes which are orientated relative to said polarized light for phase-matching, for converting said polarized laser light to a harmonic of said predetermined wavelength.

The laser system just described, when KTP is used as the second harmonic generating means and when pumped with near infrared light, functions as a stable source of green light. The single frequency laser of the present invention has been found to be a precise source of power, since it runs in a well-defined, single spectral mode with consistent polarization. Moreover, the power is high, spatial hole burning is eliminated, the output power variations due to changes in cavity temperature are repeatable and the IR polarization is well defined regardless of cavity temperature and mode. In addition, the mode distribution does not change when the laser is slightly vibrated, struck or if the pump mode changes.

Numerous other advantages and features of the present invention will become readily apparent from the following detailed description of the invention, the embodiments described therein, from the claims, and from the accompanying drawings.

DETAILED DESCRIPTION

Figure 1:
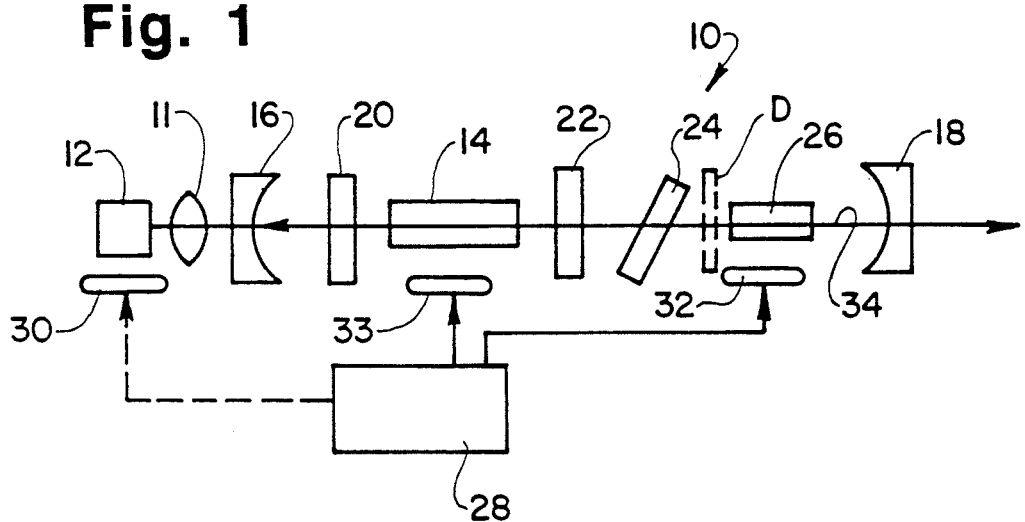
FIG. 1 is a schematic diagram of the single frequency green laser that is the subject of the present invention.

While this invention is susceptible of embodiment in many different forms, there is shown in the drawings, and will herein be described in detail, at least three specific embodiments of the invention. It should be understood, however, that the present disclosure is to be considered an exemplification of the principles of the invention and is not intended to limit the invention to the specific embodiments illustrated.

Turning to FIG. 1, there is illustrated a single frequency green laser 10 which comprises: a source 12 of optical pumping radiation, a lasant material 14, an input mirror 16, an output coupler 18, two quarter-wave plates 20 and 22, a polarizing element 24, and a non-linear, optical, harmonic-generating material or element 26 (i.e., alternatively referred to as a "frequency doubler"). A temperature control 28 is used to control a thermo-electric cooler 30 for the source 12 and heaters or coolers 32 and 33 for the laser cavity.

The source 12 provides optical pumping radiation to the lasant material 14. A focusing means or lens 11 (e.g., an optical element having a gradient refractive index or GRIN, a ball lens, an aspheric lens, a combination of lenses, etc.) can be used to focus the output of the source 12 onto the lasant material 14. This focusing results in a high pumping intensity and an associated high photon to photon conversion efficiency in the lasant material 14. Any number of combinations of sources and lasant materials can be used.

Preferably, the source 12 is a light emitting semi-conductor, such as a diode-laser or diode-laser array, and the laser material 14 is a non-birefringent crystal, such as a garnet doped with a rare-earth, active material (e.g., Nd:YAG), or a crystal that includes a rare-earth, active material which is a stoichiometric component of the lasant host material (e.g., lithium neodymium tetraphosphate (LNP) or neodymium pentaphosphate (NPP).

If desired, the output facet of the semiconductor light source 12 can be placed in a close coupled or in butt-coupled relationship to input face of the lasant material 14 without the use of a focusing means 11. As used herein, "butt-coupled" is defined to mean a coupling which is sufficiently close such that a divergent beam of optical pumping radiation emanating from semiconductor light source 12 will optically pump a mode volume within a lasant material 14 with a sufficiently small transverse cross-sectional area so as to support essentially only single transverse mode laser operation (i.e., TEM$_{00}$ mode operation) in the lasant material 14.

Highly suitable lasant materials 14 for butt-coupled operation include neodymium-doped YAG or Nd:YAG, gadolinium gallium garnet (Gd$_3$Ga$_5$O$_{12}$) or GGG, and gadolinium scandium gallium garnet (Gd$_3$Sc$_2$Ga$_3$O$_{12}$) or GSGG, and especially LNP or NPP. By way of specific example, neodymium-doped YAG is a highly suitable lasant material for use in combination with an optical pumping means which produces light having a wavelength of about 800 nm. When pumped with light of this wavelength, neodymium-doped YAG can emit light having a wavelength of approximately 1064 nm.

The precise geometric shape of lasant material 14 can vary widely. For example, lasant material can be rod-shaped, or rhombohedral in shape if desired. If desired, an end-pumped fiber of lasant material can be used. Highly suitable fibers for this purpose include, but are not limited to, glass optical fibers which are doped with ions of a rare-earth metal such as neodymium. The length of such a fiber is easily adjusted to result in absorption of essentially all of the optical pumping radiation. If a very long fiber is required, it can be coiled, on a spool for example, in order to minimize the overall length of the laser of this invention.

A highly suitable source 12 of optical pumping radiation consists of a gallium aluminum arsenide laser diode array, emitting light having a wavelength of about 800 nm, which is attached to heat sink. Such laser diodes are well known to those skilled in the art and may be obtained from a variety of suppliers (e.g., Spectra-Diode Laboratories, SONY, Laser Diode Inc., Siemens, etc.). The heat sink can be passive in character. However, the heat sink can also comprise a thermoelectric cooler 30 to help maintain laser diode array 12 at a constant temperature and thereby ensure optimal operation of laser diode array at a constant wavelength. The temperature of a laser diode source 12 can be regulated by means of control electronics 28. Separate controls for temperature regulation of the source 12 and the pumped laser cavity can be used. It will also be appreciated, of course, that during operation the optical pumping means or source 12 will be attached to a suitable power supply. Electrical leads from laser diode array which are directed to a power supply are not illustrated in the drawings for clarity.

A laser cavity having a longitudinal extending axis 34 is formed by the input mirror 16 and the output coupler or mirror 18. Both mirrors are highly (e.g., 99% or more) reflective (HR) at the wavelength (i.e., the fundamental or $\lambda_F$) of the lasant material rod 14 (e.g., 1064 nm for Nd:YAG). The input mirror 16 is coated so as to transmit the light (e.g., 800 nm) the source 12 (e.g., highly transmissive (HT) at about 85% or more) and to be highly reflective at the wavelength of the fundamental.

The output coupler 18 is a mirror which is coated to be HT at the harmonic of the wavelength of light emitted by the lasant material or rod 14 (e.g., 532 nm (green) for Nd: YAG lasing at 1064 nm). The output mirror 18 and input mirror 16 are conventional in character and, for example, can comprise suitable conventional coatings on appropriate substrates.

Light from the lasant material or rod 14 interacts with the non-linear optical material 26 to double the frequency of the light from the lasant material. Materials having non-linear optical properties are well-known. For example U.S. Pat. No. 3,949,323 issued to Bierlein et al. discloses that non-linear optical properties are possessed by materials having the formula MTiO(XO$_4$) where "M" is at least one of K, Rb, Ti and NH$_4$; and "X" is at least one of P or As, except when NH$_4$ is present, then "X" is only P. This generic formula includes potassium titanyl phosphate (KTP) or KTiOPO$_4$, a particularly useful non-linear material.

Preferably the frequency doubling material 26 is KTP. KTP has one of the highest non-linear optical coefficients. KTP is a biaxial material having axes which are preferably arranged for Type-II phase-matching (e.g., having its Z-axis perpendicular to the reference axis 34 of the cavity and at about 45° to one side of a plane (i.e., a plane coincident with the plane of drawings and the direction of polarization established by the polarizing element 24) which lies along the reference axis).

Non-linear optical material, such as KTP, have the ability of converting light at predetermined of fundamental wavelength into light at a harmonic of that light (i.e., light at frequency $\omega$ is converted to light at the second harmonic 2 $\omega$ or near-infrared light at a wavelength of 1064 nm is converted to green light at a wavelength of 532 nm). Other non-linear optical materials which are suitable for frequency doubling include: potassium dihydrogen phosphate (KDP) or KH$_2$PO$_4$; ammonium dihydrogen phosphate (ADP) or NH$_4$H$_2$PO$_4$; ammonium dihydrogen arsenate (ADA) or NH$_4$H$_2$AsO$_4$; cesium dideuterium arsenate (CDA) or CsH$_2$AsO$_4$; beta-barium-borate (BBO) or $\uparrow$-BaB$_2$O$_4$; lithium triborate (LBO) or LiB$_3$O$_5$; as well as KTiOAsO$_4$, lithium idodate (LIO) or LiIO$_3$, LiNbO$_3$, KNbO$_3$, HIO$_3$, KB$_5$O$_8$-4H$_2$O, KLiNbO$_3$, and organic materials including urea. A review of the non-linear optical properties of a number of different uniaxial crystals has been published in *Sov. J. Quantum Electron*, Vol. 7, No. 1, Jan. 1977, pp. 1–13. Non-linear optical materials have also been reviewed by S. Singh in the CRC *Handbook of Laser Science and Technology*, Vol III, M.J. Weber, Ed., CRC Press, Inc., Boca Raton. Fla., 1986, pp. 3–228.

The conversion of optical radiation of one frequency to optical radiation of another frequency through interaction with a non-linear optical material is well-known and has been extensively studied. Examples of such conversion include harmonic generation, optical mixing and parametric oscillation. Second-harmonic generation or "frequency doubling" is perhaps the most common and important example of non-linear optics wherein part of the energy of an optical wave of angular frequency $\omega$ propagating through a non-linear optical crystal is coverted to energy of a wave of angular frequency 2 $\omega$. Second-harmonic generation has been reviewed by A. Yariv in *Quantum Electronics*, Second Ed., John Wiley & Sons, New York, 1975 at pages 407–434 and by W. Koechner in *Solid State Laser Engineering*, Springer-Verlag, N.Y., 1976 at pages 491–524.

Electromagnetic waves having a frequency in the optical range and propagating through a non-linear crystal are believed to induce polarization waves which have frequencies equal to the sum and difference of those of the exciting waves. Such a polarization wave can transfer energy to an electromagnetic wave of the same frequency. Those skilled in the art know that the efficiency of energy transfer from a polarization wave to the corresponding electromagnetic wave is a function of: (a) the magnitude of the second order polarizability tensor of the optical material (since this tensor element determines the amplitude of the polarization wave); and (b) the distance over which the polarization wave and the radiated electronmagnetic wave can remain sufficiently in phase, or "phase-matched" for the non-linear conversion process.

A conventional method for achieving such phase-matching in a non-linear optical material utilizes the fact that dispersion (the change of refractive index with frequency) can be offset by using the natural birefringence of uniaxial) or biaxial crystals. Such crystals have two refractive indices for a given direction of propagation which correspond to the two allowed, orthogonally-polarized propagation modes. Accordingly, by an appropriate choice of polarization, direction of propagation and crystal axes orientation, it is often possible to achieve phase-matching in a birefringent non-linear optical crystal. The term "phase-match axis," as used herein, refers to a line or direction through a non-linear optical crystal along which the substantially phase-matched conversion of a stated input radiation into a stated output radiation is permitted for at least certain polarization of said input radiation. Type-I phase-matching requires that the incident waves interacting in the non-linear material have the same polarization. Type-II phase-matching requires that the incident waves interacting in the non-linear optical material have orthogonal polarizations.

KTP is a frequency doubling material that can be Type-II phase matched. Such a material 26 is preferably temperature tuned so that it has an effective length of an integral multiple of half the wavelength of the fundamental (e.g., $$\frac{\lambda_F}{2}, \lambda_F, \frac{3\lambda_F}{2}.$$

etc., where $\lambda_F$ is the wavelength at which the lasant rod 14 lases and $\lambda_2 = \lambda_F/2$, where $\lambda_2$ is the wavelength of the harmonic). A heater 32 and conventional control electronics 28 can be used for this purpose. In a short cavity, temperature regulation of the laser diode source 12 can affect the temperature of the frequency doubling, non-linear optical material 26. Preferably, a pre-established temperature gradient is detected and maintained. A heating element 33 adjacent to the lasant rod 14 and another element 32 adjacent to the frequency doubler 26 can be used to establish and maintain a desired temperature gradient. Judicious selection and location of temperature sensors will minimize temeprature feedback and cross-talk between the source cooler 30 and the cavity gradient heaters 33 and 32. Alternatively, the frequency doubling material 26 can be housed to insulate it from the source 12. By keeping the frequency doubler 26 at this preferred length, polarized light at the fundamental wavelength will under go a phase shift of an integral multiple of 180° each time it passes through the frequency doubler.

The two quarter-wave plates 20 and 22 function primarily as a means for substantially eliminating spatial hole burning in lasant material by causing circular polarization of the cavity radiation and thereby creating a "twisted mode" optical cavity. The twisted mode technique for producing an axially uniform energy density in a laser cavity is described by V. Evtuhov et al., *Appl. Optics*, Vol 4. No. 1, pp. 142-143 (1965). Also see Draegert, "Efficient Single-Longitudinal-Mode Nd:YAG Laser," *IEEE J. Quant. El.*, QE-8, 235 (1972).

Any conventional means for substantially eliminating spatial hole burning in the lasant material can be used in the practice of this invention. For example, spatial hole burning can be eliminated through the use of a traveling wave, ring-like optical cavity, by mechanical motion, or by electro-optic phase modulation. Here, the quarter-wave plate 22 which is located next to the polarizing element 24 is oriented with an axis (e.g., its fast axis) at about b 45° from a plane containing the direction of polarization established by the polarizing element 24 along the reference axis 34. This same quarter-wave plate 22 is also aligned to the otpical axis of the frequency doubler 26.

Preferably the waveplates are identical, and corresponding axes of the waveplates are "crossed" or arranged with corresponding axes at right angles to each other and the reference axis 34 (e.g., fast axis of waveplate 22 is perpendicular to the fast axis of waveplate 20). Quartz waveplates 20 and 22 having a thickness of 1.01 mm can be used. The quarter-wave plates 20 and 22 are located adjacent to opposite ends of the lasant rod 14. The result is standing wave pattern in the cavity which is linearly polarized at the cavity end mirrors 16 and 18. The mode is circularly polarized in the laser rod 14;, this gives a standing wave where the electric field vector rotates through the gain medium or laser rod, and where there are no standing wave nodes within the gain medium.

The function of the input mirror 16 can be obtained by coating one waveplate 20 with suitable reflective coatings (e.g., anti-reflection (AR) at about 800 nm and HR at approximately 1064 nm on one side and AR at 1064 and 800 nm on the other side). This reduces the number of components and the total cost.

The last component of the laser 10 is a polarizing element 24. Preferably, the polarizing element 24 is a Brewster plate whose plane is at the plate's Brewster angle to the reference axis 34. The polarizing element 24 establishes a direction of polarization within the laser cavity which, according to the orientation of FIG. 1, is in the plane of the drawings. The two quarter-wave plates 20 and 22, together with a non-birefringent lasant material (e.g., Nd: YAG) form a field of circular polarized light which are summed together in going from one end to the other end of the resonant laser cavity. The polarization can also be achieved by means of coatings on mirrors, a dielectric polarizer, or other suitable polarization means. A Brewster angled surface at one end of the lasant rod 14 can be used if quarter-wave plates are not needed to control spatial hole burning.

The combination of the polarizing element 24 and a birefringent frequency doubling material 26, having an effective length which is an integral multiple of half the wavelength of the fundamental, functions in a manner which is similar to a Lyot filter (i.e., a Lyot-Ohman filter) for laser radiation reflecting back and forth within the cavity. A Lyot filter is a monochromatic polarizer. Since spatial hole burning is controlled by the two quarter-wave plates 20 and 22, and uniform intensity between the two quarter-wave plates is achieved by the polarizing element 24, the output light from this cavity is essentially single frequency.

To limit the number of oscillating spatial modes (i.e., maintain the TEM$_{00}$ mode) an aperture disk "D" can be inserted between the laser rod 14 and the frequency doubling element 26. In one embodiment, where the frequency doubler 26 was KTP having a cross section of about 1.5 mm$^2$, an aperture of approximate 0.03 inches in diameter was used. Those skilled in the art will understand that the aperture disk may be located anywhere in the cavity and that its size is a function of pump cross section, mirror radius and cavity length.

The components of the present invention may be assembled in any one of a number of different ways. Assembly is facilitated by building the laser from two sub-assemblies, in particular, an upper sub-assembly comprising: the output mirror 18, the frequency doubler 26, an aperture disk "D" (if used) and the polarizing element 24; and a lower assembly comprising: a GRIN lens, two quarter-wave plates 20 and 22, and the laser rod 14. More specifically, each sub-assembly is formed by mounting the components in disk-like holders, stacking the holders, and locking the holders in place. In forming the upper sub-assembly, the axes of the frequency doubler 26 are preferably at about 45° to the direction of polarization established by the polarizing element 24. After each subassembly is formed, the two sub-assemblies are stacked and locked together, making sure that the principal direction or axes of the KTP or frequency doubler 26 of the upper sub-assembly are aligned as closely as possible (e.g., within one degree of arc or better) to the axes of the quarter-wave plate 22 (i.e., in the lower sub-assembly) which is located adjacent to the polarizing element 24.

Figure 2:
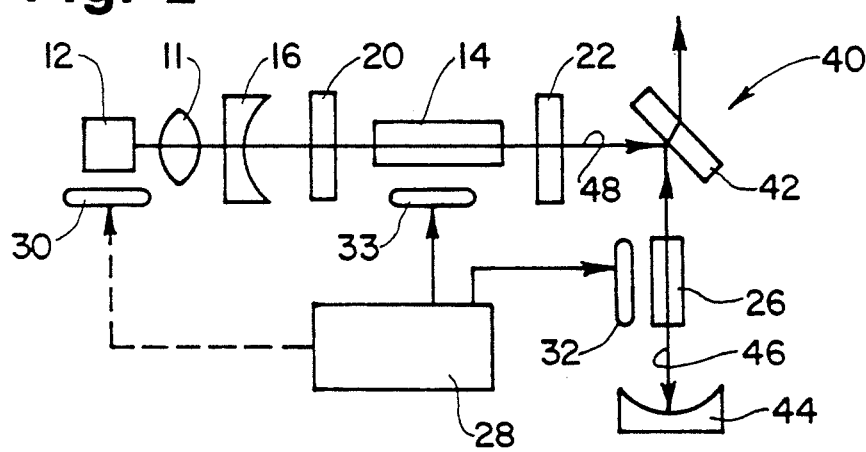
FIG. 2 is a schematic diagram of another embodiment of the invention of FIG. 1.

Another embodiment of the invention is shown in FIG. 2. All of the components of that laser 40 are the same with the exception that a polarizing reflector or bending mirror 42 is used as an output coupler and a dual band mirror 44 is used to form an L-shaped cavity. The polarizing reflector 42 is HR at the fundamental wavelength for one polarization and transmissive at the harmonic wavelength; it serves to replace the polarizing element 24 shown in FIG. 1. The polarizing reflector 42 reflects light at the incoming fundamental in a path 46 which is at right angles to the path 48 of the incoming radiation. This is done to maximize the green output while avoiding the destructive interference effects which can occur with reflected second harmonic light.

The intensity of the green output at the polarizing reflector 42 will depend on the relative phases of the 532 nm harmonic beams reflected off the dual band mirror 44 at one end of the frequency doubler 26, and the 532 nm beam generated on the second pass through the frequency doubler. If they are optimally phased, the output will be four times that generated in a single pass. If they are out of phase, the two green outputs will cancel, leading to a reduced green output. The phase of the reflected beam will depend upon the design of the dual band mirror 44 as well as the distance between the dual band mirror and the frequency doubler 26. The latter effect is due to the dispersion of air. By placing the dual band mirror 44 fairly close to one end of the frequency doubler 26, or applying the reflective coating directly to one end of the frequency doubler, the distance effect can be minimized. Phase-preserving coatings are known to those skilled in the art and need not be further discussed.

The Lyot filter, comprising the frequency doubler 26 and the polarizing reflector 42 (or other suitable polarizing element 24 of FIG. 1), is a strongly wavelength-selective element. The transmission calculated for these two elements is such that the laser could be operated successfully in a single frequency regime without the elimination of spatial hole burning; thus, the quarter-wave plates 20 and 22 may not be needed. The elimination of the quarter-wave plates 20 and 22 allows the design shown in FIG.'s 1 and 2 to be implemented using fewer components. One potential weakness of the Lyot filter is its relatively narrow, free-spectral range; for example, it is possible to have low-loss modes at both 1064 nm and 1061 nm. Nevertheless, this difficulty can be resolved in at least two ways:

1) The quarterwave-plates 20 and 22 can serve another function besides the elimination of spatial hole burning. If they are of different thicknesses, or if they are oriented with their optical axis aligned, then they constitute a second birefringent element in the cavity. Moreover, since they are at the opposite end of the cavity from the frequency doubler 26, they form a second elementary Lyot filter. By suitable choice of lengths or thicknesses of the birefringent material, the free spectral range of this second Lyot filter can be made much larger than that of the Lyot filter at the other end of the cavity. This results in a situation where the KTP Lyot filter has the effect of selecting a specific mode at which the laser operates, while the quarter-wave-plate Lyot filter functions to prevent oscillation of some further removed undesirable mode (e.g., ones at 1061 nm and 1074 nm). Thus, in this configuration, and where there is only one low-loss mode available, there is probably no need to directly or specifically eliminate spatial hole burning. A similar effect can be obtained if the two quarter-wave plate combination is replaced with a single full-wave or half-wave plate.

2) A somewhat similar effect can be achieved by locating a birefringent lasant material oriented at 45° to the polarizer axis. This forms a second Lyot filter based on the length of the gain medium. A second Lyot filter is likely to provide a free spectral range similar to that of using the KTP as a frequency doubler. However, by using the vernier principle, it should be possible to get the two filters to coincide at the desired wavelength and suppress all other lasing under the gain curve. This would then have a significant effect on spatial hole burning, since the standing waves and the two polarizations will have different wavelengths. While this may not be as efficient as two quarter-wave plates for reducing the residual gain, it should reduce it substantially and may be enough by itself to achieve the desired operating conditions.

Figure 3:
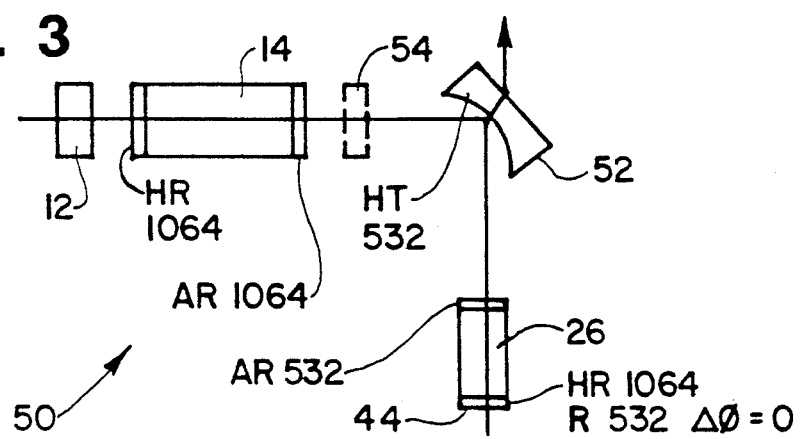
FIG. 3 is a schematic diagram of a variation of the embodiments shown in FIG. 2.

FIG. 3 shows a cavity design 50 which incorporates some of these concepts. The axes of the KTP frequency doubler 26 are oriented at 45° to the polarizing reflector 52 to form a Lyot filter. Coatings 44 to form a phased reflector are located directly at the far end of the frequency doubler 26, wherein there is no ambiguity in the path length. If the KTP frequency doubler 26 has parallel end faces, both faces of the KTP frequency doubler are perpendicular to the beam, thereby minimizing losses. Here, the lasant rod of Nd:YAG 14 is of a plano-plano configuration, and has one end coated such that, with the coating 44 on the KTP frequency doubler, a laser cavity is formed. The parallelism of the rod 14 forces the perpendicularity of the AR coated face. Unlike FIG. 2, this cavity design 50 uses a curved polarizing reflector 52. One disadvantage of using a curved polarizing reflector or polarizing mirror is that it produces an elliptical beam. Nevertheless, it gives a simple self-aligning cavity design. The polarizing reflector can be replaced with a flat mirror if the input face of the Nd:YAG rod 14 is curved appropriately. A half-wave or full-wave plate 54 is shown in phantom and is used in the event that a second Lyot filter proves to be necessary. Thus, the two quarter-wave plates (used in FIG. 1 or FIG. 2) are replaced with a single half-wave or full-wave plate 54 in the design of FIG. 3.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be utilized. For example, by using means (e.g., at location "D" in FIG. 1) to control the rearward going green light (e.g., a mirror which is located between the polarizing means 24 and the frequency doubler 26 which is coated on one face for AR at 1064 nm and which is coated on the opposite face for AR at 1064 nm and HR at about 532 nm), the given polarization can be made to be directionally dependent and the power of the laser quadrupled over that of a single pass device. In addition, an electro-optic effect can be used with the Lyot filter to fine tune the laser to run with the least losses and at the center of the lasant material gain curve. Moreover, instead of using a separate lasant material and a frequency doubler, a self-doubling lasant material (e.g., Tm:LiNbO$_3$ or Nd:YAB) in combination with Lyot filtering means is suggested. Finally, the present invention can be used to produce blue light, as well as green light; the same principles apply. Thus, it will be appreciated that various modifications, alternatives, variations, etc., may be made without departing from the spirit and scope of the invention as defined in the appended claim. It is, of course, intended to cover by the appended claims all such modifications involved within the scope of the claims.

We claim:

1. A laser comprising:
    a) a lasant material which lases at a predetermined wavelength in response to optical pumping radiation and which has a front end and a back end;
    b) an input mirror for substantially reflecting lasant light towards said front end of said lasant material;
    c) an output coupler for substantially reflecting laser light towards said input mirror and for passing therethrough at least some laser light at a harmonic of said predetermined wavelength;
    d) means, located between said input mirror and output coupler, for substantially eliminating spatial hole burning in said lasant material while producing laser light at said predetermined wavelength;
    e) polarizing means, located to receive said light at said predetermined wavelength from said lasant material; and
    f) second harmonic generating means, located to receive said polarized laser light and having optic axes which are oriented relative to said polarized light for phase-matching, for converting said polarized laser light to a harmonic of said predetermined wavelength, said second harmonic generating means having a length which produces a phase retardation which is an integral multiple of a half wavelength of said light at said predetermined wavelength.

2. The laser of claim 1, further including a light emitting semi-conductor which is used to optically pump said lasant material and which selected from the group consisting of diode-lasers, superluminescent diodes, diode-laser arrays and light-emitting diodes.

3. The laser of claim 1, wherein said lasant material is a garnet which is doped with at least one rare earth selected from the group consisting of Nd, Ho, Er and Tm.

4. The laser of claim 1, wherein said second harmonic generating means is made from a material which is selected from the group consisting of KTP, ADA, ADP, CDA, KDP, MTiO(XO$_4$), BBO, KNbO$_3$, LiNbO$_3$, LBO and LIO, where "M" is at least one of K, Rb, Tl or NH$_4$, where "X" is at least one of P or As and when "M" is NH$_4$ then "X" is P.

5. The laser of claim 4, wherein said second harmonic generating means is made from KTP and has optic axes which are positioned at about forty-five degrees to an optical reference axis which passes through said ends of said lasant material and which are located in a plane which is generally perpendicular to said optical reference axis.

6. The laser of claim 1, wherein said length of said second harmonic generating means is maintained by controlling its temperature to function as a half-wave plate at the wavelength of said predetermined wavelength.

7. The laser of claim 1, wherein said polarizing means is selected from the group consisting of a polarizing reflector and an optical surface which lies in a plane which is at the Brewster angle relative to the light from said lasant material.

8. The laser of claim 1, wherein said means for substantially eliminating spatial hole burning comprises two quarter-wave plates, one of said waveplates being located adjacent to each of said ends of said lasant material, said waveplates having optic axes which are generally perpendicular to the axis of the cavity formed by said input mirror and said output coupler.

9. The laser of claim 2, wherein said light emitting semi-conductor is close coupled to said back end of said lasant material.

10. The laser of claim 1, further including means to reduce the rearward going light at said harmonic wavelength.

11. The laser of claim 1, wherein said input mirror is coated to transmit therethrough to said back end of said lasant material at least some of said optical pumping radiation.

12. The laser of claim 1, wherein said lasant material is a non-birefringent crystal.

13. A laser, comprising:
    a) a lasant material which lases at a predetermined wavelength in response to optical pumping radiation from diode-laser means and which has two opposite ends through which an optical reference axis is located;
    b) mirror means, located between one end of said lasant material and said laser diode means and along said reference axis, for transmitting at least some of said optical pumping radiation to said one end of said lasant material and substantially reflecting lasant light at said predetermined wavelength into said lasant material;
    c) polarizing reflector means, adjacent to the other end of said lasant material, for polarizing said lasant light radiated from said lasant material, for reflecting substantially said polarized lasant light in a light path which is at an angle to said optical reference axis, and for passing therethrough at least some laser light at a harmonic of said predetermined wavelength;

d) second harmonic generating means, having an effective length which is a half integral multiple of said predetermined wavelength of said laser light, for receiving polarized light from said polarizing reflector means and converting said polarized laser light to said laser light at a harmonic of said predetermined wavelength, wherein said second harmonic generating means is characterized by two refractive indices for a given direction of propagation; and e) a mirror, located along said light path, for substantially refecting laser light from said second harmonic generating means in a phased relationship with said light from said lasant material and towards said polarizing reflector means.

14. The laser of claim 13, wherein said mirror comprises a reflective coating on one end of said harmonic generating means.

15. The laser of claim 13, wherein said polarizing reflector means is a curved mirror.

16. The laser of claim 14, further including means, located along said reference axis and equivalent to two birefringent quarter-wave plates having optical axes which are at right angles to said reference axis, for forming a Lyot filter.

17. A laser comprising:

a) non-birefringent lasant rod means for lasing at a predetermined wavelength in response to optical pumping radiation and which has two opposite ends which define an optical reference axis;

b) an input mirror for transmitting at least some of said optical pumping radiation to one end of said lasant rod means and for substantially reflecting light at said predetermined wavelength towards said one end of said lasant rod means;

c) Brewster plate means, located along said optical reference axis, for polarizing said light at said predetermined wavelength;

d) birefringent second harmonic generating means, located along said optical reference axis, for receiving said polarized light and converting said polarized laser light to a harmonic of said predetermined wavelength;

e) two quarter-wave plates which are located adjacent to said opposite ends of said lasant rod means and which have optic axes which are aligned relative to each other to function, with said Brewster plate means, as one Lyot filter;

f) means for maintaining the temperature of said second harmonic generating means to function, with said Brewster plate, as a second Lyot filter; and g) an output mirror, located along said optical reference axis, for substantially reflecting laser light at said predetermined wavelength towards said Brewster plate means and for transmitting therethrough at least some of said light at said harmonic of said predetermined wavelength.

18. The laser of claim 17, wherein said second harmonic generating means has optical axes which are aligned for phase-matching said harmonic generating means to said polarized light.

19. A single frequency laser, comprising:

a non-birefringent lasant material which is adapted to lase at a fundamental wavelength in an optical cavity in response to a source of optical pumping radiation;

spatial hole burning elimination means, located adjacent to at least one end of said lasant material, for substantially eliminating spatial hole burning in said cavity; and Lyot filter means, in said cavity, for monochromatically polarizing lasant light radiated from said lasant material and for converting at least some of said polarized lasant light to light at substantially a harmonic wavelength.

20. The laser of claim 19, wherein said spatial hole burning elimination means comprises:

one quarter-wave plate which is located at one end of said lasant material and which has a fast axis; and an essentially identical quarter-wave plate which is located at the opposite end of said lasant material and which has a fast axis which is at an angle to said fast axis of said one quarter-wave plate.

21. The laser of claim 20, wherein said one quarter-wave plate carries an input mirror for one end of said cavity.

22. The laser of claim 21, wherein the opposite end of said cavity comprises an output coupler for substantially reflecting laser light towards said input mirror.

23. The laser of claim 22, wherein said Lyot filter means is adjacent to the opposite end of said lasant material.

24. The laser of claim 20, wherein said Lyot filter means comprises:

polarizing means for polarizing light along a direction of polarization; and a phase-matched, birefringent, frequently-doubling material whose axes are positioned at acute angles to said direction of polarization established by said polarizing means, said fast axes of said quarter-wave plates lying on each side of said direction of polarization, said birefringent material having an effective length equal to an integral multiple of half the wavelength of said light at said fundamental wavelength.

25. The laser of claim 24, wherein said birefringent material is temperature tunable to function as an integral multiple of half the wavelength of said light at said fundamental wavelength.

26. The laser of claim 25, wherein said source is a diode-laser; and further including: means for controlling the temperature of said birefringent material; and means for controlling the temperature of said diode-laser.

27. The laser of claim 26, wherein said temperature of said diode-laser is separately controllable from the temperature of said birefringent material.

28. The laser of claim 24, wherein said polarizing means is a Brewster plate.

29. A method of producing green or blue light at essentially a single frequency, comprising the steps of:

a) locating a lasant rod in an optical cavity which is formed by two mirrors and which defines a reference axis;

b) pumping one end of said rod with diode-laser means to produce light at an infrared or near infrared wavelength;

c) polarizing said light from said rod along a direction of polarization;

d) using a frequency doubling crystal to convert said polarized light to light whose wavelength is about half the wavelength of said light from said rod, said crystal material having optic axes which are arranged for phase-matching relative to said direction of polarization; and e) maintaining said crystal at a temperature such that it produces a phase shift which is an integral multiple of one half the wavelength of said polarized light from said rod.

30. The method of claim 29, further including the step of eliminating spatial hole burning in said rod by locating a quarter-wave plate adjacent to each end of said rod, and by positioning both plates at right angles to said reference axis.

31. The method of claim 29, wherein step (c) is performed by using a transparent plate which lies in a plane which is at the Brewster angle relative to said reference axis.

32. The method of claim 29, wherein said lasant rod is made from Nd:YAG; and wherein said crystal is made from KTP.

* * * * *